Nov. 3, 1970    K. BAÜERLE    3,538,358
OSCILLATING ARMATURE MOTOR
Filed Oct. 18, 1968    2 Sheets-Sheet 1

INVENTOR:
KURT BAÜERLE
BY McGlew and Toren
ATTORNEYS

Nov. 3, 1970   K. BAÜERLE   3,538,358
OSCILLATING ARMATURE MOTOR
Filed Oct. 18, 1968   2 Sheets-Sheet 2
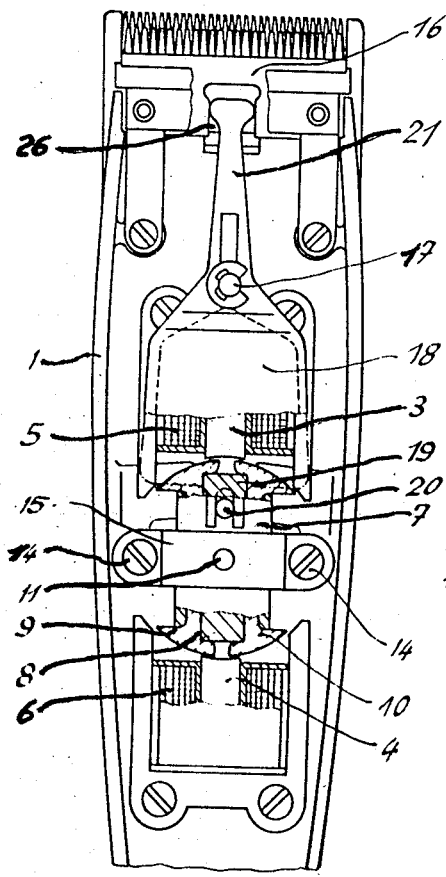
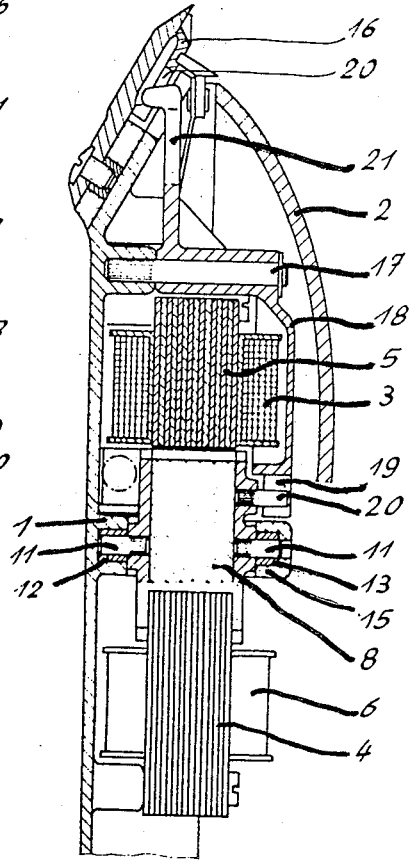
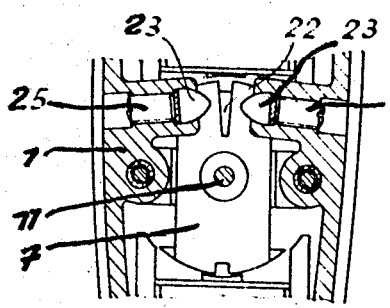
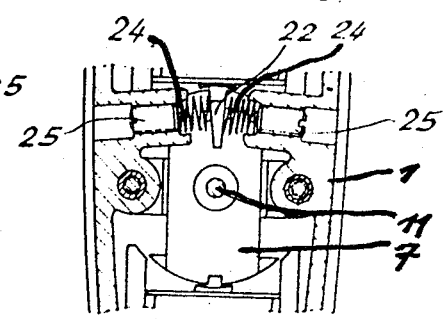
INVENTOR
KURT BAUERLE
BY Naylew and Toren
ATTORNEYS 3,538,358
OSCILLATING ARMATURE MOTOR
Kurt Baüerle, Schramberg-Sulgen, Black Forest, Germany, assignor to Kuno Moser GmbH, Unterkirnach, Black Forest, Germany
Filed Oct. 18, 1968, Ser. No. 768,736
Claims priority, application Germany, Nov. 13, 1967, 1,613,320, M 60,587
Int. Cl. H02k $33/12$
U.S. Cl. 310—29                    5 Claims

ABSTRACT OF THE DISCLOSURE

An oscillating armature motor, particularly for driving a reciprocating working element in a machine, such as a hair-cutting machine, comprises an electromagnet system energizable by an alternating current, and an oscillatable armature carrying a permanent magnet having poles cooperating with the poles of the electromagnet system to oscillate the armature in synchronism with the periodicity of the alternating current energizing the electromagnet system. The electromagnet system includes two electromagnets each having a magnetic structure including a center leg and two outer legs, with the energizing winding being on the center leg. The two outer legs have the same instantaneous polarity and this polarity is the opposite of the polarity of the center leg. With respect to the two electromagnets, the instantaneous polarities are the reverse of each other.

BACKGROUND OF THE INVENTION

An oscillating armature motor, for driving hair-cutting and like machines, has already become known in the art, in which a permanent magnet is arranged to oscillate between two poles of an AC-energized exciting electromagnet. The permanent magnet in this arrangement has the form of a disc with a central hole, or of a ring, disposed to swing freely between two like outer poles of an exciting electromagnet. In such an arrangement the amplitude of the oscillating armature system is limited by the disc-shaped pole faces of the exciting electromagnet between which the armature oscillates. The magnetic flux is not therefore efficiently utilized. Moreover, in the design of such an oscillating armature motor the amplitude of the armature must be very accurately determined.

In another electric hair-cutting machine known in the art, a permanent magnet is attached to a swing lever, driving the cutter of the machine, in such a way that the two pole-shoes of the permanent magnet form an armature oscillating across three poles of different polarities of an AC-energized electromagnet.

Although in this form of construction the above-mentioned shortcomings of the first-described oscillating armature system are overcome and the fluxes generated by the permanent electromagnet and the exciting magnet are relatively efficiently utilized, a relatively large amplitude of oscillation of the armature is nevertheless required to achieve a satisfactory efficiency. However, a large amplitude tends to generate considerable vibration due to the angular inertial moments which affect the machine about a more or less eccentric fulcrum. In an oscillating armature motor required for driving a manually manipulated machine such as a hair-cutting machine, this is a major drawback.

SUMMARY OF THE INVENTION

It is an object of the present invention to provide an oscillating armature motor which eliminates the above-mentioned drawbacks.

Another object of the invention is the provision of an oscillating armature motor of generally substantially improved efficiency, in other words of a motor which is capable of providing a considerably better driving force than conventional motors without consuming more power.

To attain these objects, the present invention provides an oscillating armature motor, particularly for driving a reciprocating working element in a machine, more specifically in a hair-cutting machine, which comprises an electromagnet system energizable by an alternating current, and an oscillating armature of symmetrical configuration consisting of a permanent magnet and poleshoes and disposed to perform oscillatory motions about its center of symmetry. In this arrangement, substantially no vibratory moments are transmitted to the machine because no significant eccentric oscillatory forces are generated. Nevertheless, the amplitude of the oscillating armature can be large and the conditions of magnetic flux utilized to the best advantage. This involves a reduced consumption of power.

In a preferred embodiment of an oscillating armature motor proposed by the invention, the armature, comprising the permanent magnet and its twin-pole poleshoes, may have the shape of an H-section armature. In such a form of construction the electromagnet system which is excited by an alternating current for driving the armature, is divided into two halves, each half facing one set of poles of the armature. This arrangement introduces symmetry not only into the design of the oscillating armature but also into the disposition of the associated energizing system of electromagnets so that the entire motor assumes the nature of a twinned oscillating system.

More particularly it is preferred so to construct the oscillating armature and its permanent magnet that the poleshoes of the permanent magnet extend in relatively spaced and parallel disposition on each side of the permanent magnet and at each end form neighboring poles of opposite polarity facing three poles of one of the exciting electromagnet of which the center pole alternates in opposition to the two outer poles and all the poles alternate in antiphase to the poles of the other exciting electromagnet in such a manner that the armature is induced to oscillate in synchronism with the periodicity of the alternating current exciting the two three-pole exciting electromagnet. This embodiment of the invention provides a very compact arrangement which is particularly suitable for incorporation in a machine such as a hair-cutting machine.

Moreover, additional structural advantages are gained if the oscillating armature comprising a permanent magnet and two twin-pole poleshoes is encased in a plastics body. Thus, for mounting the armature, a short axle pin may be arranged to project centrally from each side of the plastics body. Preferably these pins may extend normal to the bottom part of an external casing and one of the axle pins may be mounted in a bearing in the bottom part of the casing, whereas the other may be mounted in a bridge member secured to the casing. This facilitates assembly of the motor in the casing of the machine and renders it accessible and capable of being easily dismantled after removal of the cover provided for closing the casing.

BRIEF DESCRIPTION OF THE DRAWINGS

An embodiment of the invention will now be described by way of example and with reference to the accompanying drawings in which:

FIG. 3 is a plan view of the oscillating armature motor according to FIGS. 1 and 2 built into the casing of a hair-cutting machine which the motor is intended to drive, the drawing showing the arrangement in part section after removal of the coverplate of the casing;

FIG. 4 is a side elevational view of FIG. 3, partly in the form of a vertical longitudinal section, taken through the center of the hair-cutting machine;

FIGS. 5 and 6 are fragmentary views of two modifications of amplitude limiting means for the oscillating armature seen from the underside of the machine shown in FIG. 3.

DESCRIPTION OF THE PREFERRED EMBODIMENT

Figure 1:
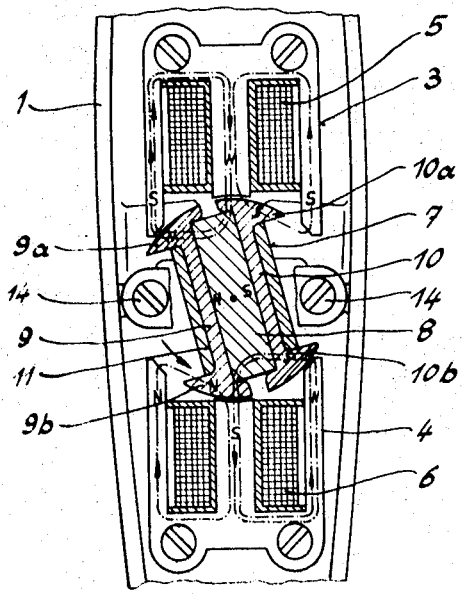
FIGS. 1 and 2 illustrate the magnet system of an oscillating armature motor according to the present invention, the system being shown in part longitudinal section with the armature in each of its two possible end positions in which it reverses its direction of swing.
Figure 2:
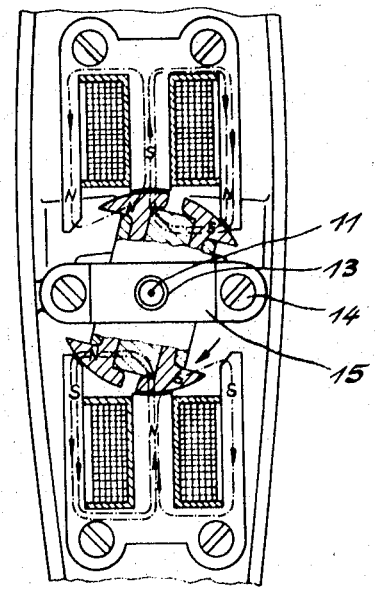
Figure 7:
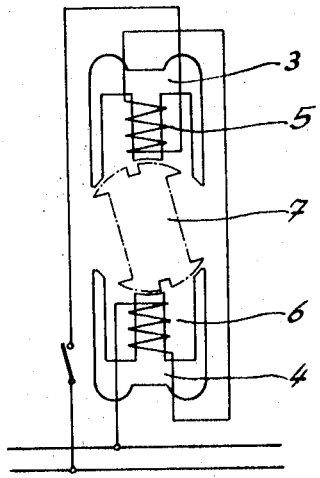
FIG. 7 illustrates the principle of wiring the electromagnet system in an oscillating armature motor according to the invention.

The oscillating armature motor shown in the drawings is contained inside a casing 1 made of a plastics material and, in the conventional manner, closed by a cover 2 (FIG. 4). Substantially, the oscillating armature motor comprises two exciting electromagnets 3 and 4 which have coils 5 and 6 energized by an alternating current. As will be understood from the drawings, each of these coils 5 and 6 is mounted on the center limb of a three-limbed core. Each electromagnet therefore provides three consecutive poles of changing polarity, as indicated in FIGS. 1 and 2. The oscillating armature 7 is mounted between the two exciting electromagnets 3 and 4. This oscillating armature 7 contains a permanent magnet 8 having poles disposed in the manner indicated in FIG. 1 and associated double poleshoes 9 and 10 of opposite polarity. The armature 7 is oscillatable about its center axis 11. The polarities of the poles illustrated in FIGS. 1 and 2 are those arising as a result of the reversal in direction in the course of one cycle of the exciting current, the illustrated pole reversal causing the oscillating armature 7 to move to and fro.

The oscillating armature 7 is mounted in two sinter metal bearings 12 and 13. One of these bearings 12 is secured to the bottom half of the casing 1, whereas the other bearing 13 is secured to a bridge 15 bolted by two screws 14 to the bottom half of the casing 1. For transmitting the oscillatory motion to the cutter 16 of the hair-cutting machine, a two-armed lever 18 is mounted on a pivot pin 17. The rearward lever arm has a forked end 19 embracing a driving pin 20 affixed to the oscillating armature 7. The other lever arm 21 of the two-armed lever 18 extending towards the cutter of the hair-cutting machine is constructed so as to engage a suitably shaped recess 26 in the cutter 16.

The amplitude of the oscillating movement of the armature 7 is limited by an arrangement consisting of a projection or stud 22 molded integrally with the armature 7 and of two cooperating rubber buffers 23 as illustrated in FIG. 5, or of two coil springs 24 as shown in FIG. 6. Adjustment of the correct amplitude of armature oscillation is effected by two adjusting screws 25.

It will be clearly understood from the drawings that the magnet system of the oscillating armature motor is of symmetrical design. The centrally disposed and symmetrically shaped oscillating armature 7 with its associated permanent magnet 8 and its double poleshoes 9 and 10 having poles 9a, 9b and 10a, 10b oscillates between the poles of alternating polarity of the two three-pole exciting electromagnets 3 and 4. This oscillatory movement of the armature 7 is represented in FIGS. 1 and 2 by showing the two end positions of the armature and the corresponding polarities of the exciting electromagnets. The favorable cooperation of the flux of the permanent magnet and of the alternating flux of the exciting electromagnets is indicated by dot and dash lines and the resultant polarities of the poles are clearly marked by the designations N and S. It will be understood that the provision of an exciting electromagnet on each side of the armature and the configuration of the poles on the oscillating armature are designed to improve the output so that the sturdy and powerful permanent magnet 8 can be used without incurring drawbacks. Furthermore, by taking advantage of a large amplitude of oscillation of the armature 7 and of the adjustment facilities provided by the adjusting screws 25, the most favorable interaction of the DC and AC fluxes can be achieved. The result is an ideally non-vibratory action of the oscillating drive due to the advantageous central disposition of the symmetrical oscillating armature between the masses of the two exciting electromagnets. The center of gravity of the oscillating system substantially coincides with the armature axis, eccentric masses being wholly eliminated. The disposition and configuration of the oscillating armature, as proposed by the present invention, leads to an increase of the driving power above that obtainable in conventional oscillating armature systems of the same power consumption. This also contributes towards ensuring an action of the oscillating armature motor which is free from vibration.

The oscillating armature proposed by the invention has a permanent magnet system with clearly defined poles, which moves to and fro across the poles of a system of electromagnets. It is therefore permissible to speak of a polarized oscillating armature or, in a more general way, of a polarized oscillating armature motor, instead of simply of an oscillating armature motor.

While a specific embodiment of the invention has been shown and described in detail to illustrate the application of the principles of the invention, it will be understood that the invention may be embodied otherwise without departing from such principles.

What is claimed is:

1. An oscillating armature motor, particularly for driving a reciprocating working element in a machine, such as a hair-cutting machine, said motor comprising an electromagnet system energizable by an alternating current, and an oscillating armature of symmetrical configuration consisting of a permanent magnet and poleshoes, and mounted to perform oscillatory motions about its center of symmetry; said oscillating armature having the shape of an H-section armature and said electromagnet system being divided into two exciting electromagnets facing said poleshoes of said oscillating armature; said poleshoes extending in relatively spaced and parallel relation on respective opposite sides of said permanent magnet and, at each end, forming neighboring poles of opposite polarity; each of said exciting electromagnets including three poles; the neighboring poles at each respective end of said permanent magnet facing the three poles of a respective one of said exciting electromagnets; the center pole of each exciting electromagnet alternating in opposition to the two outer poles thereof, and all the poles of each exciting electromagnetic alternating in anti-phase to the poles of the other exciting electromagnet in a manner such that said armature is induced to oscillate in synchronism with the periodicity of the alternating current exciting said two three-pole exciting electromagnets.

2. An oscillating armature motor as set forth in claim 1, wherein said oscillating armature, comprising said permanent magnet and its two twin-pole poleshoes, is contained in a molded plastics body from which a short axle pin projects centrally on each side for mounting said oscillating armature.

3. An oscillating armature motor as set forth in claim 2, wherein said axle pins extend perpendicularly to the bottom part of an external casing and one of said axle pins is mounted in a bearing in said bottom part of said casing, the other axle pin being mounted in a bridge member secured to said casing.

4. An oscillating armature motor as set forth in claim 1, comprising a two-armed lever for transmitting the oscillatory movement of said armature to a reciprocably driven part of said machine, one arm of said lever having a fork end embracing a driving pin on said armature and the other arm of said lever engaging a recess in said reciprocatory part, said double armed lever being fulcrumed on a pivot pin fitted inside said casing of said machine.

5. An oscillating armature motor as set forth in claim 4, wherein said reciprocably driven part is the cutter of a hair-cutting machine.

References Cited

UNITED STATES PATENTS 3,039,395    6/1962    Chausson _____ 310—36 X

FOREIGN PATENTS 334,787    1/1959    Switzerland.

DONOVAN F. DUGGAN, Primary Examiner.

U.S. Cl. X.R.

30—45; 310—36